(12) United States Patent
Sorotokin et al.

(10) Patent No.: US 7,535,475 B2
(45) Date of Patent: May 19, 2009

(54) VIRTUAL VIEW TREE

(75) Inventors: Peter Sorotokin, Cupertino, CA (US);
Richard A. Dermer, Issaquah, WA (US); Daniel J. Clark, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 342 days.

(21) Appl. No.: 11/263,798

(22) Filed: Nov. 1, 2005

(65) Prior Publication Data
US 2007/0097138 A1 May 3, 2007

(51) Int. Cl.
G09G 5/00 (2006.01)
G06T 17/00 (2006.01)
G06F 17/00 (2006.01)
G06F 3/00 (2006.01)

(52) U.S. Cl. ............... 345/581; 345/420; 715/200; 715/209; 715/234; 715/760

(58) Field of Classification Search ........... 345/420, 345/581; 715/500, 502, 513, 514, 515, 526, 715/528, 529, 760, 907
See application file for complete search history.

(56) References Cited

U.S. PATENT DOCUMENTS

| 5,945,992 | A | 8/1999 | Cunniff | |
|---|---|---|---|---|
| 7,061,486 | B2 * | 6/2006 | Sowizral et al. | 345/420 |
| 2002/0087596 | A1 * | 7/2002 | Lewontin | 707/513 |
| 2003/0221168 | A1 * | 11/2003 | Kozlov | 715/513 |
| 2005/0027823 | A1 | 2/2005 | Rana | |
| 2005/0187954 | A1 | 8/2005 | Raman et al. | |

FOREIGN PATENT DOCUMENTS

EP 1224622 11/2004

OTHER PUBLICATIONS anl.gov web page, as provided by Internet Archive Wayback Machine at http://web.archive.org/web/*/http://www.newton.dep.anl.gov/askasci/comp99/CS017.htm, as published between Jul. 13, 2000 and Nov. 19, 2000.*
Deweese, et al., "Re: Multi Resolution Data," XP002421313, Feb. 3, 2004.
Marriot, et al., "Fast and Efficient Client-Side Adaptivity for SVG," WWW 2002, Jul. 7, 2002, pp. 496-507, XP002381113.
European Search Report for Application No. 06255634.5-1527, mailed Mar. 13, 2007.

* cited by examiner

*Primary Examiner*—Xiao M Wu
*Assistant Examiner*—Tize Ma
(74) *Attorney, Agent, or Firm*—Robert C. Kowert; Meyertons, Hood, Kivlin, Kowert & Goetzel, P.C.

(57) ABSTRACT

A virtual view tree for representing a document. A virtual view tree is maintained by an application, rather than a renderer (e.g., graphics rendering library) called upon by the application to display the document. The view tree is virtual in that nodes need not be created until they are to be displayed. When instructed to display the document, the renderer requests nodes and their attributes. The nodes may be cached while the renderer works on their content, but may be removed from memory anytime thereafter. Only a subset of the virtual view tree's nodes is stored at one time, and only in non-persistent storage. The application includes various APIs for navigating a virtual view tree, describing its attributes and caching its nodes. The APIs may be directly accessible to the renderer or may be invoked by subsystems of the application (e.g., client, tree navigation and caching subsystems).

22 Claims, 4 Drawing Sheets

VIRTUAL VIEW TREE

BACKGROUND

This invention relates to the field of computer graphics. More particularly, a method and apparatus are provided to facilitate the drawing or manipulation of a document using a virtual view tree of the document.

The drawing of a document, and corresponding communication between a graphics application that manipulates the document (i.e., a program for creating, modifying or displaying computer graphics) and a graphics library for displaying the document (i.e., a library of program code for rendering graphics), is traditionally handled in any of multiple ways.

In an immediate mode of operation, a set of graphics APIs (Application Programming Interfaces) is offered by the graphics library for drawing primitives that, together, compose a drawing or document. A drawing may comprise any type of displayable content, and so the primitives rendered by the APIs may include graphical shapes, images, text, data, and/or other types of objects or drawing attributes. When an application needs to display a particular drawing, it invokes the library's APIs as needed to render the individual details (e.g., to draw a line, draw a character). In the immediate mode of operation, the application maintains its own data structures for identifying the content and primitives. GDI (Graphical Device Interface) and Java2D employ the immediate mode of operation.

In this mode of operation, use of the graphics library is driven by the application. The library cannot optimize the rendering process, because it does not control data structures containing the drawing content. Rendering speeds could be improved in many cases if the graphics library knew ahead of time that a drawing did or did not employ some characteristic (e.g., transparency, color palette). Whenever a portion of the drawing changes, the application must specifically and individually instruct the library to re-render every detail of the drawing that needs to be redrawn.

In a retained mode of operation, a data structure called a view tree is defined and maintained by a graphics library. A view tree is a hierarchical data structure representing a document, and may comprise any number of nodes. Leaf nodes store content of the document, while a root node and intermediate nodes describe document structure containing the content. For example, a root node may represent an entire document or a page of a document. Intermediate nodes may group individual letters into words, glyphs into graphical objects, words into paragraphs, etc.

In the retained mode of operation, a view tree is specific to a particular graphics library, is fully defined, can be completely traversed by that library and is stored in a persistent manner. An application accesses and modifies the library's view tree, directly or through some interface, and the library renders it as necessary. SVG (Scalable Vector Graphics), HTML (HyperText Markup Language) browsers can work in retained mode.

In this mode of operation, there can be a great deal of data duplication between the library's view tree and the actual low-level data being rendered, which may deplete resources (e.g., memory) and slow the rendering. In addition, the application loses control over the data structures used by the library to drive the rendering. Because the graphics library works with primitive details of a drawing, the view tree that describes the entire drawing may be very large. It must retain all the details, and therefore may require significant storage (e.g., memory) resources.

Thus, in an immediate mode of computer graphics operation, an application invokes APIs within a library to draw individual atomic elements. Memory requirements may be low because the elements are re-generated every time they are needed. Performance, however, may suffer if there is a lot of regeneration of drawing content. In contrast, in a retained mode of operation an entire drawing is maintained by a graphics library as a view tree. The library can re-render the drawing whenever needed, but memory requirements can be significant. And, the application has no access to the data structures describing the drawing.

SUMMARY

In one embodiment of the invention, a method and apparatus are provided for using a virtual view tree to represent a document. In this embodiment, a virtual view tree is maintained by an application, rather than the renderer (e.g., a graphics rendering library) called upon by the application to display the document.

The view tree is virtual in that nodes of the tree need not be created until they are to be displayed. When instructed to display the document, the renderer requests nodes of the tree and their attributes. Nodes and their content may then be generated dynamically based on a document template, parameters of a display area (e.g., margin, font size) or other criteria.

Virtual view tree nodes may be cached and locked while the renderer works on their content, but may be unlocked and removed from memory anytime thereafter. As a result, only a subset of the virtual view tree's nodes need be stored at one time, and may only be stored in a non-persistent manner.

In one method of using a virtual view tree, an application opens a document but does not immediately create a view tree. A renderer is instructed to display the document (or a portion thereof), and starts querying the application for tree nodes and attributes. The application generates the nodes as requested, if they do not already exist or are not in cache, and may cache them for the next drawing cycle. Nodes are not stored persistently, because the application can regenerate them when needed. A cached node may be removed from cache as long as it is not locked.

The application may include various APIs (Application Programming Interfaces) for facilitating navigation of a virtual view tree (e.g., tree navigation APIs), describing its attributes (e.g., node query APIs) and caching its nodes (e.g., caching APIs). The APIs may be directly accessible to the renderer or may be invoked by subsystems of the application. In one embodiment, the application includes client, tree navigation and caching subsystems.

DETAILED DESCRIPTION

Figure 1:
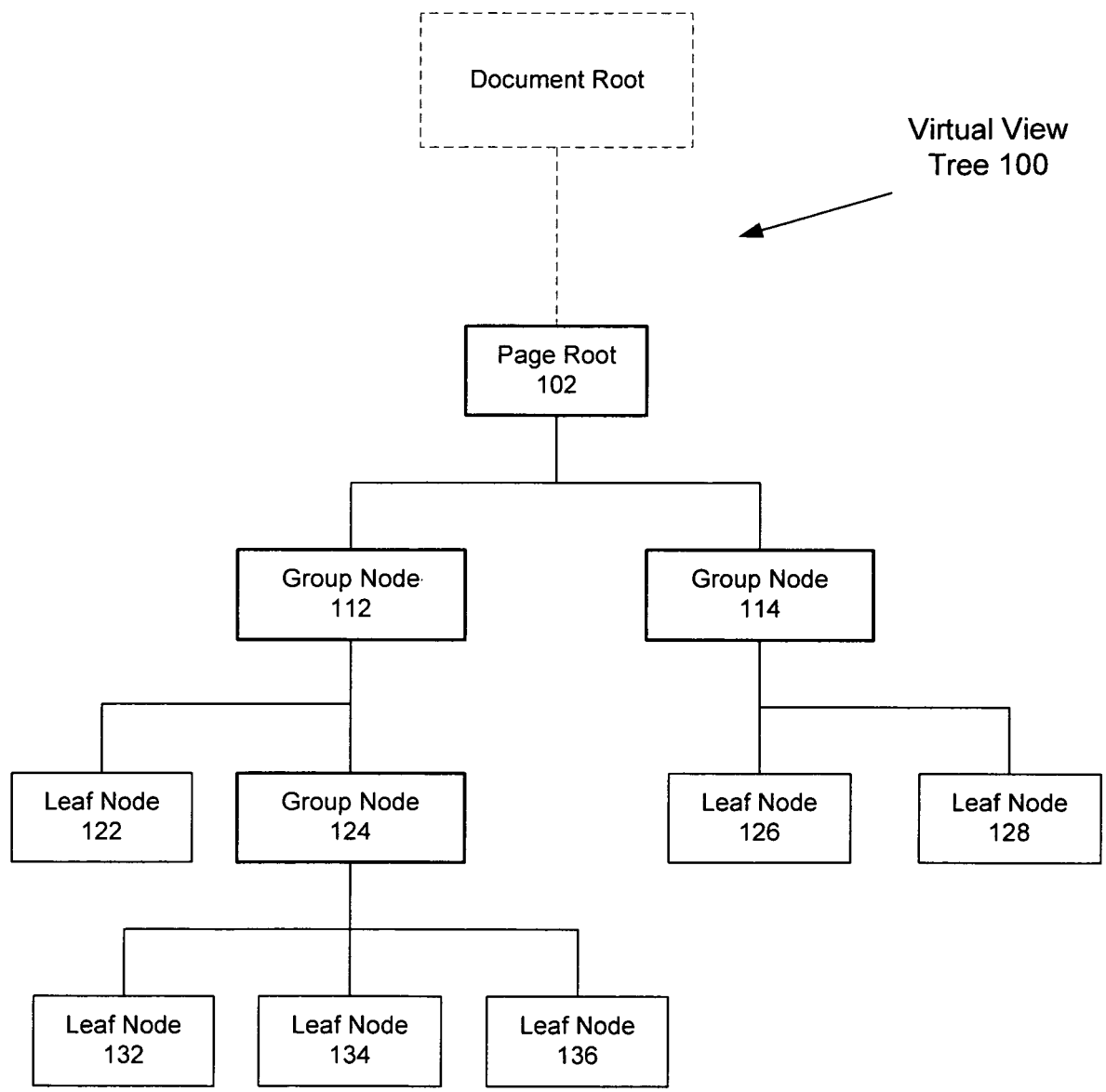
FIG. 1 is a diagram depicting a partial view tree for facilitating display of a document, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a virtual view tree representing a displayable document is provided, to facilitate the rendering of the document, along with a method and apparatus for manipulating a virtual view tree. A document may contain any number of pages, and each page may contain any type of content (e.g., graphics, images, video, text, a path), with or without animation.

A virtual view tree is virtual in that it need not be fully defined at any time. When only a portion of the corresponding document is being rendered or modified, only the corresponding portion of the virtual view tree must be available. Even when the entire document is being rendered, individual portions of the tree may be removed from memory when not currently being rendered or displayed. Illustratively, the structure of a virtual view tree may be defined (based on the document), but instead of being populated with the document content (e.g., graphics, text), the tree may contain descriptions of where to find or how to generate the content.

As one skilled in the art will appreciate, a traditional view tree is constructed by a renderer or graphics rendering library and maintained in its entirety whenever any portion of the corresponding document is being displayed; this may require significant storage (e.g., memory) resources. When an application alters the document, the view tree must be updated to keep the view tree in synchronization with the application's view of the document (e.g., a DOM or Document Object Model). The application and rendering library thus maintain their own separate impressions of the document.

In an embodiment of the present invention, a virtual view tree is maintained by a graphics application (e.g., a browser, Adobe Illustrator by Adobe Systems Incorporated). In this embodiment, the tree is assembled and manipulated by an application in response to the invocation, by a rendering library, of APIs offered by the application.

When the library is instructed to render a portion of the document, the APIs are invoked by the library to determine what to render and to learn the attributes of content to be rendered. The library may render the document (or document portion) represented by a virtual view tree in a standard manner, through appropriate calls to graphics hardware.

That is, only data needed for rendering the currently viewable portion of a page must be at hand while the document is open. Data for other portions of the page may be retrieved when needed (e.g., when a displayed page is scrolled or zoomed). The virtual view tree may, however, identify how or where to access data not currently in use (e.g., via URIs (Uniform Resource Identifiers) or other means of identifying the data or how to assemble the data).

In one embodiment of a virtual view tree, each page of the document is described by a hierarchical ordering of group nodes and leaf nodes. A group node is a node that has one or more child nodes, which may be group nodes or leaf nodes. A node may only have a single parent, but may have any number of siblings. Documents and pages nested within a document or page may be treated as group nodes.

Individual leaf nodes describe some discrete graphical content, and may be differentiable by the type of content they represent. Thus, a text node contains some text, an image node contains an image and a graphic node contains graphical content other than text or an image (e.g., a drawing, a graph). Alternatively, a leaf node may simply identify where to find its corresponding text, image or other content. Leaf nodes of the virtual view tree do not have children.

When a graphics rendering library is instructed by an application to display a document or document portion, it begins making calls to APIs or methods offered by the application. In particular, the library may request a next node of the document tree, request attributes of the node (e.g., position, color), ask whether a particular node has been modified, etc. The application populates nodes of the view tree with their content as needed, to respond to the library's function calls.

Even though any number of virtual view tree nodes may be cached at any time (e.g., even the entire tree), memory requirements can be quite low. A node or a node's content may be removed from cache at any time without the graphics library's knowledge, depending on the applicable caching scheme. In this embodiment of the invention, virtual view tree nodes are not stored in a persistent fashion (e.g., by being written to non-volatile memory or storage). And, because the graphics library does not store its own representation of the document or view tree, there is no duplication of effort between the application and library.

Nodes of a virtual view tree may have various properties, such as those described in the Scalable Vector Graphics (SVG) Full 1.1 or 1.2 Specification (e.g., available from the World Wide Web Consortium).

In one implementation, a group node of a virtual view tree has properties such as: transformation, blending, clipping, sprite, filter/mask, children (i.e., whether the group node has any child nodes), and so on. A leaf node includes properties such as: transformation, shape, fill, stroke, blending, clipping, filter/mask, etc. Nodes may also include virtually any other information helpful in traversing, modifying, rendering or optimizing the corresponding document.

Nodes of a virtual view tree are created and destroyed as needed (e.g., as the associated document is amended). For caching purposes, a node may be assigned a unique cache identifier. When a node is needed (e.g., to be rendered), it may be retrieved by its cache identifier (if the node is still cached). If not still cached, the application generates the node anew.

FIG. 1 illustrates a partial virtual view tree 100 according to one embodiment of the invention. The illustrated portion of the tree pertains to a single page of a document having a common document root.

Page root node 102 contains properties applicable to the entire page represented by the illustrated tree, and has two group node children. Group node 114 has two leaf node children, nodes 126 and 128. Group node 112 has two children, leaf node 122 and group node 124. Group node 124 has three leaf child nodes 132, 134, 136.

A virtual view tree may be constructed from a DOM (Document Object Model) tree. DOM is an interface designed to facilitate the dynamic access and updating of documents. The specification for DOM is available from the World Wide Web Consortium.

The root node of a page, such as node 102 of FIG. 1, may correspond to a single page of a document. The page root node may include a "page location" property describing the location of the page within a plane or layer in which all pages of the same document are drawn. The view may be scrolled to any location within that plane. Location or position coordinates of descendant nodes of the root node may be relative to the page location value.

Group nodes of a virtual view tree may correspond to a "g" element in an SVG document, which groups related graphic elements. However, a group node of a virtual view tree may or may not have attributes, and children of a group node in a virtual view tree may have child nodes that represent another page or set of pages. In one embodiment, properties of group nodes that are not contained in a page linked to a document root may be ignored.

A clip may be specified by a "clip-path" property of virtual view tree node, having an attribute value that identifies another view tree (or portion of a tree) defining the clip-path. The top level node in this linked tree may be treated as a group node containing a path and possibly also containing text (as a text leaf node or as one or more nested group nodes).

A gradient is specified by a fill-color or stroke-color property of a tree node, which has an attribute value identifying another view tree (or portion of a tree) defining a linear or radial gradient. The gradient tree may comprise a group node containing leaf nodes defining gradient stops.

A path node may correspond to a path element of an SVG document, a text node may correspond to a text element, and an image node may correspond to an image element (when the xlink:href is a raster image). Path, text and image nodes not contained in a page linked to a document root may be ignored.

In one embodiment of the invention, when a document is created or modified, a virtual view tree node may store information identifying where to find document content corresponding to the node, or how to generate such content. A virtual view tree may therefore be particularly well suited for representing dynamic content or documents incorporating dynamic content (e.g., a stock ticker, a weather forecast, sports scores).

In one example use of a virtual view tree, an application may be called upon to render a galley (e.g., a document) within a web page, text frame, word processing window or other type of page. The galley content is known (e.g., a newspaper article, a set of photographs) and the page layout is known (e.g., margins, font size), but the actual appearance of the galley on the page is not yet known. The application will dynamically fill the page layout from the galley and generate the virtual view tree as described herein.

As another example, when the page layout or galley content changes, a "reflow" application may be configured to alter the rendered display. Thus, if the width of a display area is used as the line width for displaying the galley content and that line width changes, the appearance of the galley will change and the view tree will change commensurately. The virtual nature of the view tree facilitates and speeds modification of the view tree and the re-rendering of the display.

A virtual view tree may also be used to facilitate the rendering of content other than documents. For example, a virtual view tree could represent a particle generator for generating particles having behaviors and attributes controlled by parameters. Particles could thus have different lifetimes, sizes, shapes, colors, and could exhibit different activity such as splitting or degenerating into different types of sub-particles, combine with other particles move in different ways, etc. Modeling a particle generator with a virtual view tree would allow the corresponding application to generate particle descriptions and behaviors on the fly.

Figure 2:
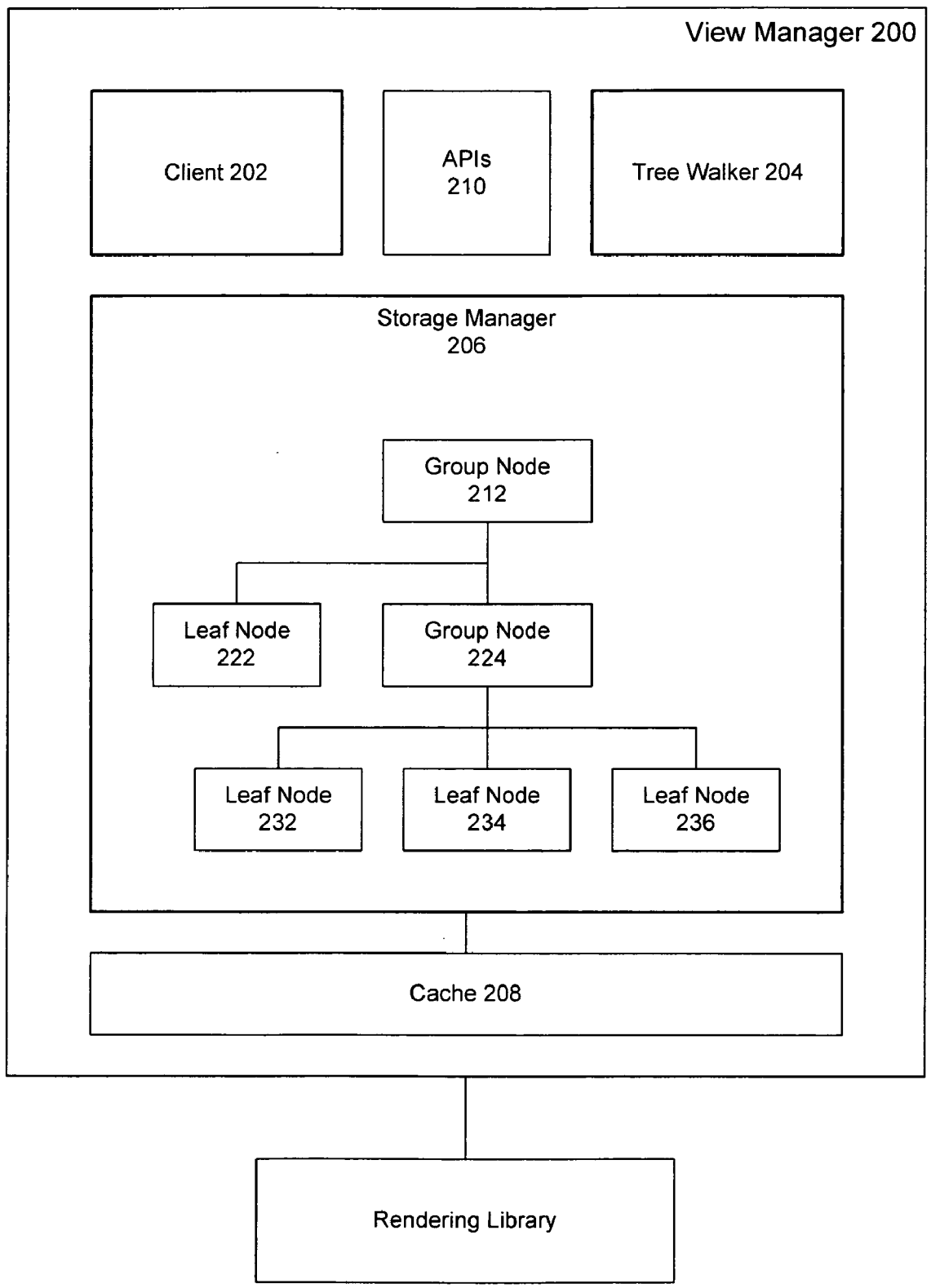
FIG. 2 is a block diagram of an application configured to facilitate drawing a document with a virtual view tree, in accordance with an embodiment of the invention.

FIG. 2 illustrates the major subsystems of a view manager application for manipulating a document and generating a corresponding virtual view tree, according to one embodiment of the invention. In this embodiment, view manager 200 includes three primary subsystems: client 202, tree walker 204 and storage manager 206, plus cache 208 and APIs 210. Storage manager 206 manages caches 208, in which it stores any number of tree nodes.

Client 202 defines or produces a virtual view tree to represent a document, and implements various APIs that allow other subsystems of the application to traverse or manipulate the tree. Illustratively, client 202 may implement interfaces or methods such as:

Reset (to set the current node to the root node);
toFirstChild (to make the current node's first child the new current node);
toLastChild (to make the current node's last child the new current node);
toNextSibling (to make the current node's next sibling the new current node);
toPrevSibling (to make the current node's previous sibling the new current node);
toParent (to make the current node's parent the new current node);
deRef (to identify the current node);
etc.

These APIs for traversing a virtual view tree may be primarily used by Tree Walker subsystem 204. For example, when a rendering library is instructed to render a document, Tree Walker 204 may receive requests for tree nodes from the library. In turn, Tree Walker 204 navigates the tree to locate the necessary node(s).

Client 202 may also implement data query APIs such as:
getNodeType (to identify the current node's type, such as group, graphics, text, image);
getCacheID (to get the current node's cache identifier);
getFillColor (for a graphic, text or image node);
getStrokeColor (to identify the current stroke color);
getPath (to identify the path to the current node);
getStrokeParams (to identify the properties of the current stroke);
pointerEvents (for hit testing to determine what object is hit when a pointing device (e.g., a cursor) is pointed at something;
getRenderParams (to get parameters such as blend mode, constant alpha, sprite, visibility, mask, filter properties, and so on);
etc.

The node query APIs may be primarily used by Tree Walker 204, to retrieve node attributes to pass to a rendering library, for example. The rendering library may be used by multiple applications.

In the embodiment of the invention depicted in FIG. 2, storage manager 206 implements APIs associated with caching or other non-persistent storage of all or a portion of a virtual view tree. Illustrative caching APIs include:
lockCacheItem (to lock the specified cache item);
releaseCacheItem (allow item to be removed from memory);
etc.

The releaseCacheItem API may automatically create the specified item (e.g., node) if it does not exist.

Unlocked or released cache items may be discarded at any time. If a discarded node's portion of a document or document page is needed again, it may have to be regenerated, based on information in the node. In one embodiment, caching is integrated with memory management of the application or host computer system. An illustrative caching scheme implemented by storage manager 206 may favor the caching of group nodes, for at least as long as any portion of the document corresponding to a descendant of the group node is being rendered or displayed. In one alternative embodiment, more or fewer APIs may be offered than are described above.

In an embodiment of the invention, the various APIs are used by the application subsystems to navigate a document's virtual view tree, determine attributes, make changes, etc. When the application instructs a graphics rendering library to render the document, the application employs the APIs to obtain information needed by the library. In particular, the application calls APIs to perform the navigation, identify document content and node attributes, and so on, and then create data constructs to talk to the renderer or graphics rendering library. The constructs may be cached to improve performance, using the caching APIs.

In another alternative embodiment of the invention, a rendering library may be able to directly invoke some or all of APIs 210. In this embodiment, when the library is instructed to render a document, it invokes the APIs as necessary to identify tree nodes, navigate the tree, retrieve attributes, determine whether a node has changed since it was last rendered, etc.

Figure 3:
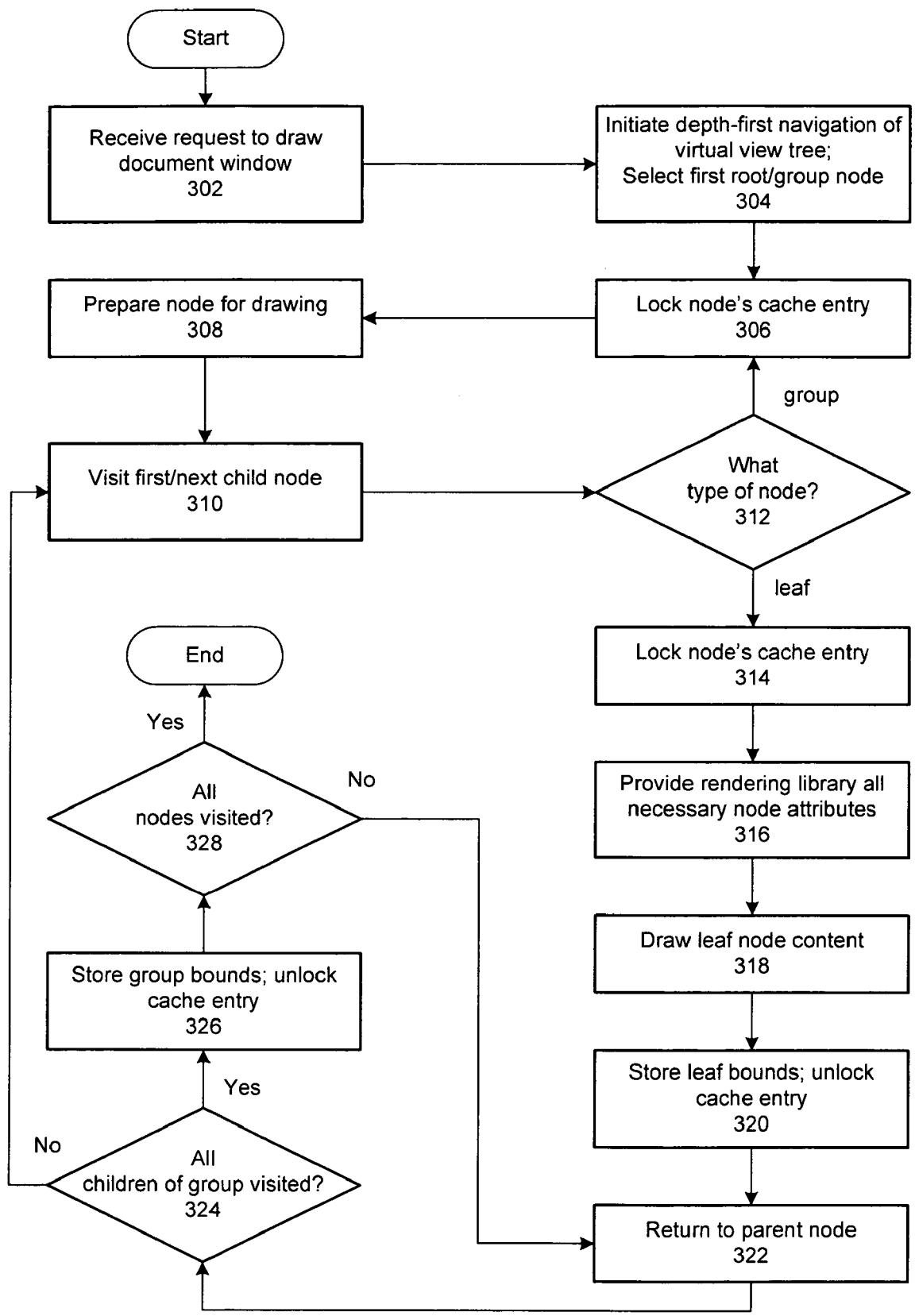
FIG. 3 is a flowchart demonstrating a method of drawing an entire document with a virtual view tree, in accordance with an embodiment of the present invention.

FIG. 3 is a flowchart demonstrating one method of rendering a document or document portion (e.g., a page), using a virtual view tree, according to one embodiment of the invention. Illustratively, the rendering may be performed in association with the opening of a document when an application starts, with a refresh operation for example.

In this method, nodes of the virtual view tree are created in a lazy fashion. That is, they are not created until they are needed by the renderer or graphics library that is instructed to display the document. Nodes may be cached, but are not stored in persistent fashion (i.e., in non-volatile storage), and may be removed from memory any time after being described to the renderer. In addition, it is unlikely that an entire virtual view tree will be maintained in memory at one time, as only nodes currently being described to the renderer (and, possibly, their ancestors) may be locked at any given time.

In operation 302, an application or application subsystem for displaying or manipulating a document, such as view manager 200 of FIG. 2, initiates the drawing of the document (or document portion). For example, a user of the application may open the document, thereby causing the application to instruct a rendering library to display a first document page.

In the illustrated embodiment of the invention, the application may be or may comprise a portion of the graphics rendering library that will actually render the document. In particular, view manager 200 of FIG. 2 may be included in a larger document or graphics application to maintain a virtual view tree and pull object properties from the tree as needed to render the document.

In operation 304, because the library does not retain a version of the document, it must ask the application for the information it requires. Using the APIs described above, the application (e.g., a tree walker module) will traverse the tree (e.g., node by node) and give the necessary information to the library as requested. Thus, in the illustrated embodiment of the invention, a depth-first, recursive descent through the tree may be performed to visit each node whose corresponding document content is to be displayed.

Initially, the rendering library asks for the first node or "thing" to be displayed. The application identifies the first node, which may be the root node of the page or document being displayed. For example, a tree walker module of the application may call an appropriate API of a client module to identify the first node. That node is identified to the rendering library using a node id, cache id or some other handle or identifier. Node attributes (e.g., color, position) may be provided at the same time or may be provided later (e.g., when the node is actually being rendered).

The first node may be assumed to be a group node, which may be treated as a layer by the rendering library. One skilled in the art will recognize how the method depicted in FIG. 3 may be adjusted if the first node is not a group node.

In operation 306, the first node's cache entry is locked (e.g., by a caching module of the application). If the node is not currently cached, a cache entry is created. A node's cache entry may be locked as long as it or any descendant of the node is being worked on.

In operation 308, the node may be prepared for rendering by the library. For example, the library may convert the node's content into primitive elements that can be rendered by hardware.

In this embodiment of the invention, the application owns a cache in which nodes may be stored. The rendering library may have access to the cache in order to store data used to render the nodes (e.g., the primitive elements). In this embodiment, the application controls the length of locking and unlocking of nodes and the lifetime of the cache itself.

In operation 310, navigation of the virtual view tree continues by visiting the first (or next) child node of the most recent group node, which may be a leaf node (e.g., a shape) or another group node (e.g., another layer). The application thus provides the rendering library a handle to the appropriate child node, which can be used to retrieve node type, attributes and/or content.

In operation 312, if the child node is a group node, the method returns to operation 306; if the node is a leaf node, the method continues at operation 314.

In operation 314, the node's entry in cache is locked, based on its cache identifier. If the node is not currently cached, a cache entry is created.

In operation 316, any missing information the rendering library needs may be retrieved using appropriate (e.g., node query) APIs. In particular, the rendering library may query the application to identify node attributes that the rendering library needs in order to be able to draw the node, if those attributes weren't received earlier.

In operation 318, the leaf node's content (e.g., graphic, image, text, path) is rendered. The rendering library may translate the node content/attributes it receives from the application into primitive that can be rendered by hardware.

In operation 320, the leaf node's bounds (e.g., a bounding box) are stored in the node and the node's cache entry is unlocked. Once the cache entry is unlocked, the node may be removed from memory. The application can regenerate the node if/when needed.

In operation 322, processing of the leaf node is complete, and so the node's parent is re-visited.

In operation 324, if all child nodes of the group node have been processed, the method advances to operation 326; otherwise, the method returns to operation 310 to visit the group node's next child.

In operation 326, the group node's bounds (e.g., a bounding box) are stored and the node's cache entry is unlocked. The group node's bounds may comprise a union of the bounds of all descendants of the group node.

In operation 328, if all nodes have been visited, the method ends. Otherwise, the method proceeds to operation 322 to return to the parent node.

Figure 4:
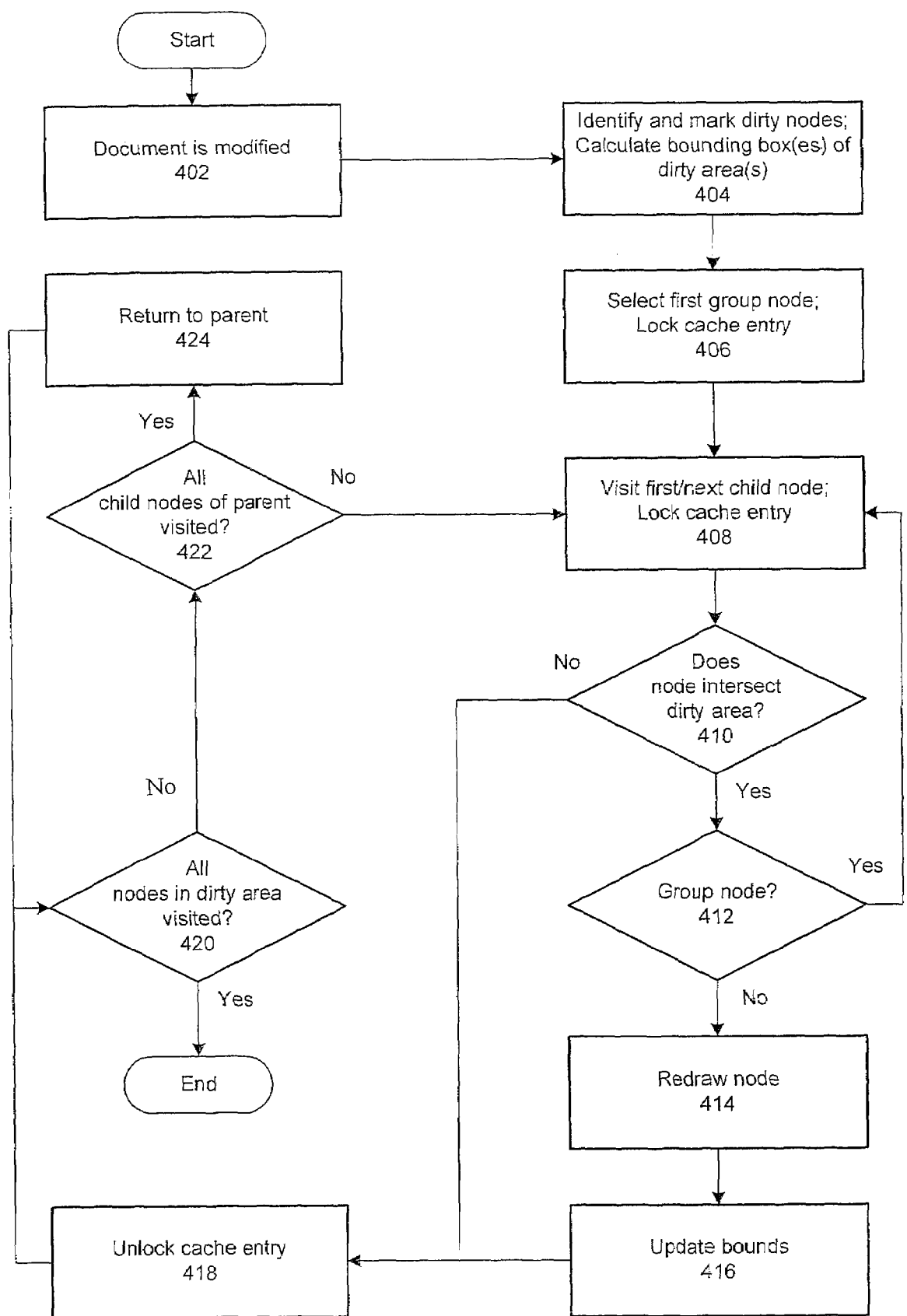
FIG. 4 is a flowchart demonstrating a method of updating a display of a modified document, in accordance with an embodiment of the present invention.

FIG. 4 demonstrates a method of using a virtual view tree to dynamically update a document, according to one embodiment of the invention. The update may involve animation, the modification of some portion of the document by an application or script, or some other type of change to the document.

In this embodiment of the invention, the application is responsible for describing what is to be drawn (e.g., document text, graphics). The renderer or rendering library generates the data necessary to actually create the display. The rendering library may compare the current state of an object to be displayed with its previous state, in order to figure out how to display the object with minimal redrawing. It may also assemble (e.g., and cache) information indicating how to draw an object; for example, the rendering library may convert a complex path into a list of triangles.

In operation 402, the document is modified in some way, through the insertion or deletion of some content, by altering a display attribute, etc.

In operation 404, the virtual view tree is navigated to mark as "dirty" each leaf node of the virtual view tree having content that changed. All ancestors of changed nodes and nodes intersecting dirty nodes or bounding boxes of dirty nodes may also be marked dirty. During this navigation, bounding boxes may be generated for any visited nodes that do not already have them.

In one implementation, the bounding boxes of dirty leaf nodes may be combined to form one or more larger bounding boxes defining the affected or dirty area. In another implementation, the bounding box of the lowest group node in the tree that encompasses all dirty leaf nodes may be used as the bounding box of the affected area. In yet another implementation, multiple dirty nodes' bounding boxes may be unioned to form a complex dirty path.

In operation 406, starting at a root or other group node (e.g., the lowest group node that encompasses all dirty leaf nodes), the virtual view tree will be navigated again to redraw tree nodes located within the bounding box(es) of dirty areas—area affected by the modification. This navigation may be driven by the rendering library, as it asks for nodes to be rendered, node attributes, etc.

In operation 408, the first or next child of the group node is visited and its cache entry is locked.

In operation 410, the node's bounding box is compared to the bounding box of the dirty area to determine if the node is dirty. If there is no intersection, the method advances to operation 418. Instead of using the bounding box of the dirty area to identify dirty nodes, nodes that include (or have descendants that include) modified content may have been marked (e.g., in operation 404). In this alternative scenario, the application may simply determine whether the node is marked. If the node is not dirty, the method advances to operation 418.

Otherwise, the node is dirty, and in operation 412, if the child node is a group node, the method returns to operation 408. If the child node is a leaf node, the method continues at operation 414.

In operation 414, the rendering library is instructed to redraw the node. The library may be given a handle to the node, to allow it to query for node attributes that it does not already have.

In operation 416, the leaf node's bounding box is updated if necessary. Other node content and/or attributes may be updated as well. If any child node of a group node is redrawn, then the group node's bounding box is recalculated as the union of all its child nodes.

In operation 418, the current node's cache entry is unlocked, meaning that it can be removed from memory at any time.

In operation 420, a test is made to determine whether all marked nodes or all nodes within the bounding box identifying the dirty area have been visited. If so, the method ends. If not, the method advances to operation 422.

In operation 422, if one or more siblings of the current node have not yet been visited, the illustrated method returns to operation 408. Otherwise, the method proceeds to operation 424.

In operation 424, the current node's parent becomes the current node and the method returns to operation 420 to determine whether all dirty nodes have been visited.

In one alternative embodiment of the invention, a single pass through the virtual view tree may be sufficient to redraw the document after a modification. For example, the entire document may have been marked as changed.

In this alternative embodiment, a separate pass through the tree to mark dirty nodes is not performed. Instead, the method of drawing or redrawing may be similar to the method of FIG. 3, except that nodes already have bounding boxes, and so any nodes whose boxes do not intersect the dirty area may be ignored. The dirty area may be readily determined by the application when it receives the document modification.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of using a virtual view tree to facilitate rendering of a document, the method comprising:
   (a) identifying the document to be rendered;
   (b) instructing a renderer to display the document;
   (c) receiving from the renderer a request for a node of a virtual view tree representing the document;
   (d) creating the requested node if the node does not already exist;
   (e) caching the requested node in cache memory if the node is not already cached;
   (f) providing one or more attributes of the requested node to the renderer; and
   (g) repeating (c)-(f) for all nodes to be rendered;
   wherein nodes of the virtual view tree are not created until requested by the Renderer; and wherein said (a) through (g) are performed by an application separate from the renderer.

2. The method of claim 1, wherein nodes of the virtual view tree are stored only in a non-persistent manner.

3. The method of claim 2, wherein nodes of the virtual view tree may be removed from the cache memory any time after being described to the renderer, wherein nodes are described to the renderer by providing one or more attributes of the nodes to the renderer.

4. The method of claim 1, wherein nodes of the virtual view tree are created by the application designed to provide access to the document, and not by the renderer.

5. The method of claim 1, wherein the renderer is a graphics rendering library.

6. The method of claim 1, further comprising:
offering the renderer a set of APIs (Application Programming Interfaces) for obtaining a virtual view tree node and/or an attribute of a virtual view tree node.

7. The method of claim 1, wherein said (c) comprises receiving an invocation of an API configured to facilitate navigation of the virtual view tree.

8. The method of claim 1, wherein said (e) comprises receiving an invocation of an API configured to facilitate caching of a virtual view tree node.

9. The method of claim 1, wherein said (f) comprises receiving an invocation of an API configured to facilitate retrieval of virtual view tree node attributes.

10. The method of claim 1, wherein said (a)-(g) are performed by the application executed by a user to access the document.

11. A computer readable memory storing instructions that, when executed by a computer, cause the computer to perform a method of using a virtual view tree to facilitate rendering of a document, the method comprising:
(a) identifying the document to be rendered;
(b) instructing a renderer to display the document;
(c) receiving from the renderer a request for a node of a virtual view tree representing the document;
(d) creating the requested node if the node does not already exist;
(e) caching the requested node in cache memory if the node is not already cached;
(f) providing one or more attributes of the requested node to the renderer; and
(g) repeating (c)-(f) for all nodes to be rendered;
wherein nodes of the virtual view tree are not created until requested by the Renderer; and
wherein said (a) through (g) are performed by an application separate from the renderer.

12. An apparatus for facilitating display of a document, using a virtual view tree, the apparatus comprising:
a memory storing instructions executable to implement:
an application configured to represent a document as a virtual view tree comprising multiple nodes;
a set of APIs (Application Programming Interfaces) embedded within the application and including:
tree navigation APIs configured to facilitate traversal of the virtual view tree;
node query APIs configured to facilitate retrieval of attributes of tree nodes; and
caching APIs configured to facilitate caching of tree nodes; and
a link to a graphics rendering library comprising executable code for displaying graphical information on a display device, wherein the graphics rendering library is separate from the application;
wherein said APIs are invoked when the document is to be rendered by the graphics rendering library, wherein at least some of the APIs embedded within the application are invoked by the graphics rendering library to render the document; and
wherein one or more nodes of the virtual view tree are stored only in non-persistent memory.

13. The apparatus of claim 12, wherein the application comprises:
a client subsystem configured to implement said tree navigation APIs.

14. The apparatus of claim 13, wherein the application further comprises:
a tree walker subsystem configured to invoke said tree navigation APIs and said node query APIs.

15. The apparatus of claim 13, wherein said client subsystem is further configured to implement said node query APIs.

16. The apparatus of claim 13, wherein the application further comprises:
a caching subsystem configured to implement said caching APIs.

17. The apparatus of claim 16, wherein the application further comprises:
a tree walker subsystem configured to invoke said tree navigation APIs and said node query APIs;
wherein said caching APIs are invoked by one or more of said client subsystem and said tree walker subsystem.

18. The apparatus of claim 12, wherein:
said node query APIs are invoked by a tree walker subsystem of the application.

19. The apparatus of claim 12, wherein the application instructs the graphics rendering library to display the document on the display device.

20. The apparatus of claim 19, wherein the graphics rendering library displays the document by:
requesting a node of the virtual view tree from the application; and
degenerating the node into a collection of primitives that can be displayed using the executable code.

21. The apparatus of claim 20, wherein the requested node is not created by the application until requested by the graphics rendering library.

22. The apparatus of claim 21, wherein the requested node may be removed from the non-persistent memory anytime after being described to the graphics rendering library.

* * * * *